United States Patent [19]

Silvis et al.

[11] Patent Number: 4,460,167
[45] Date of Patent: Jul. 17, 1984

[54] LEAF SPRING END MOUNTING STRUCTURE

[75] Inventors: John E. Silvis; William W. Fant, both of Fayetteville, Ark.

[73] Assignee: NI Industries, Inc., Novi, Mich.

[21] Appl. No.: 312,922

[22] Filed: Oct. 19, 1981

[51] Int. Cl.³ .............................................. B60G 11/02
[52] U.S. Cl. ........................................ 267/42; 267/55; 403/121
[58] Field of Search ............... 267/7, 17 R, 17 A, 42, 267/44, 47, 54 R, 54 B, 54 E, 55, 56; 105/197.1, 453; 403/121

[56] References Cited

U.S. PATENT DOCUMENTS

| | | | |
|---|---|---|---|
| 119,907 | 10/1871 | Wisell | 267/47 |
| 463,342 | 11/1891 | Cliff | 267/47 |
| 749,313 | 1/1904 | Miller | 267/55 |
| 1,371,695 | 3/1921 | Latshaw | 267/55 |
| 1,602,386 | 10/1926 | Batz | 267/55 |
| 1,972,857 | 9/1934 | Couch | 267/55 |
| 1,974,135 | 9/1934 | Drenning | 105/197.1 |
| 2,015,026 | 9/1935 | Barrows | 105/197.1 |
| 2,040,180 | 5/1936 | Martin | 105/197.1 |
| 2,052,640 | 9/1936 | Martin | 105/197.1 |
| 2,097,083 | 10/1937 | Shafer | 105/197.1 |
| 2,103,122 | 12/1937 | Stark | 267/47 |
| 2,109,715 | 3/1938 | Zweibel | 105/197.1 |
| 2,171,206 | 8/1939 | Baselt | 267/55 |
| 2,199,907 | 5/1940 | Barrett et al. | 105/197.1 |
| 2,287,963 | 6/1942 | Barrett et al. | 105/197.1 |
| 2,322,680 | 6/1943 | Young | 105/197.1 |
| 2,338,952 | 1/1944 | Martin | 105/197.1 |
| 2,357,530 | 9/1944 | Martin | 105/197.1 |
| 2,533,511 | 12/1950 | Rowland et al. | 267/47 |
| 2,849,226 | 8/1958 | Maruhn | 267/47 |
| 3,041,985 | 7/1962 | Brill et al. | 105/453 |
| 3,151,575 | 10/1964 | Dickey et al. | 105/453 |
| 3,190,632 | 6/1965 | Barenyi | 267/47 |

OTHER PUBLICATIONS

Drawing No. SKC-80286, Winamac Steel Products Div., 1/12/80.
Drawing No. SKB-81288, Winamac Steel Products Div., 1/30/81.

*Primary Examiner*—Douglas C. Butler
*Assistant Examiner*—R. R. Diefendorf
*Attorney, Agent, or Firm*—Harness, Dickey & Pierce

[57] ABSTRACT

The end mounting blocks of full elliptic leaf spring suspension systems are preferably retained by flanged ends on the leaf springs protruding into corresponding openings or slots on the end blocks. The end blocks also include end walls adapted to be abuttingly engageable with the flanged ends. By such a construction, the end blocks are restricted or limited from excessive movement in either a forward or rearward direction relative to the leaf spring ends. The end blocks also include load-receiving members for engaging the ends of the leaf springs whereby the area of load-transferring engagement between the end blocks and the leaf spring ends increases as the leaf springs resiliently deflect under increased load on the suspension system.

1 Claim, 9 Drawing Figures

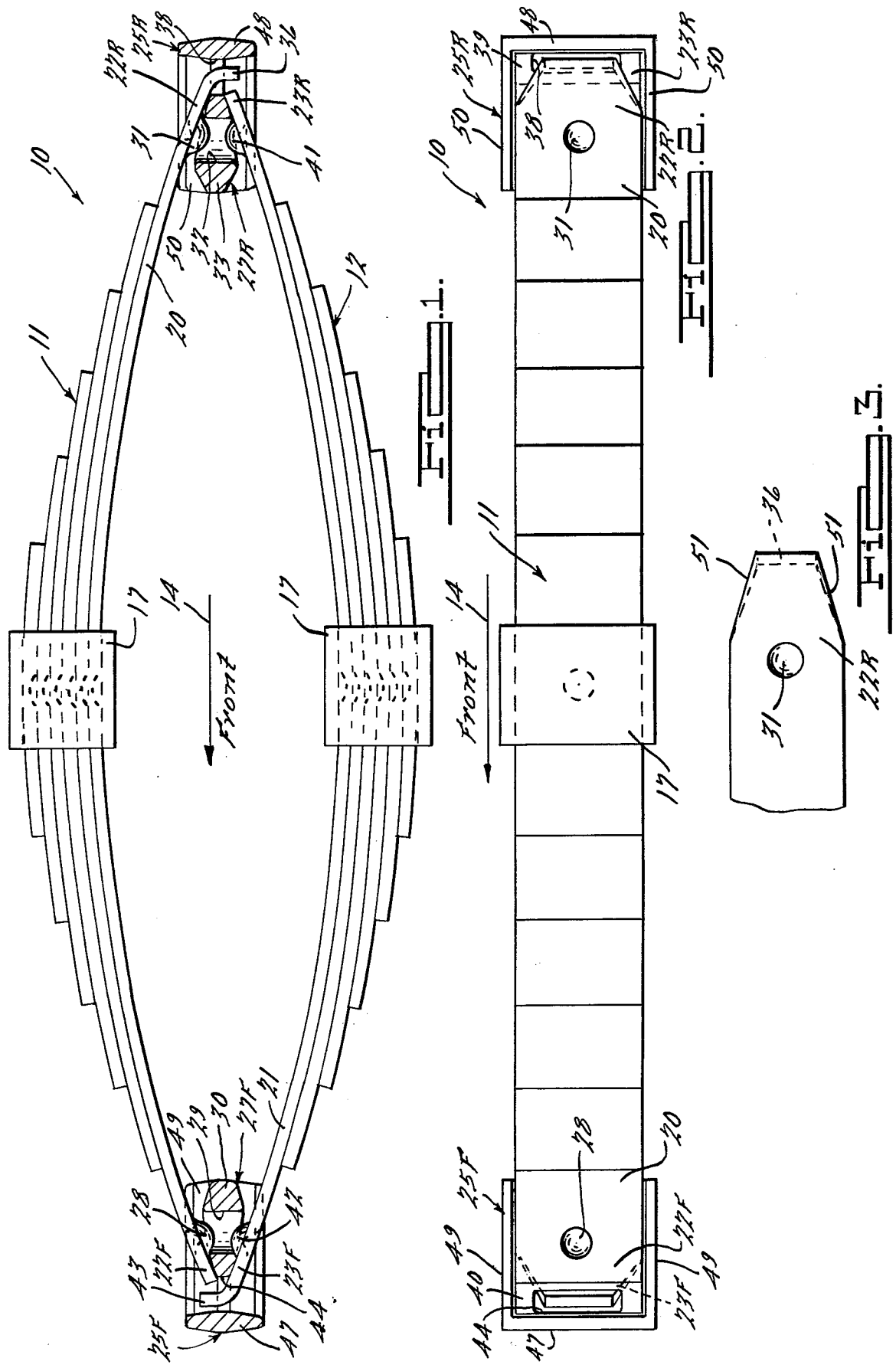

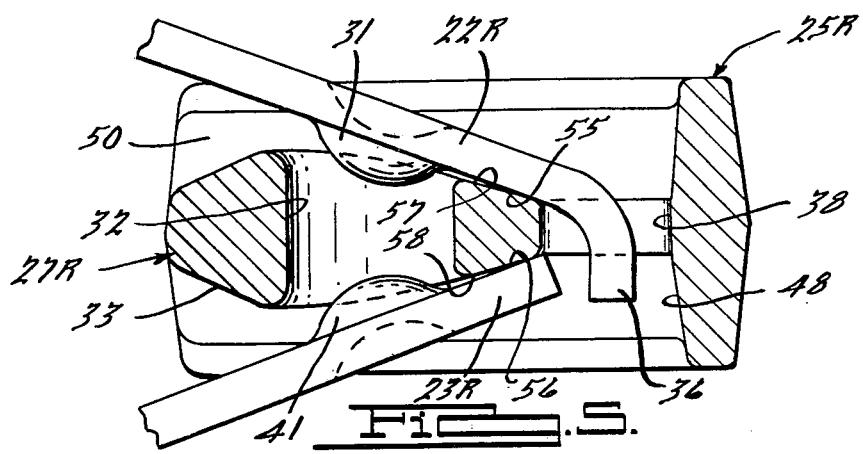
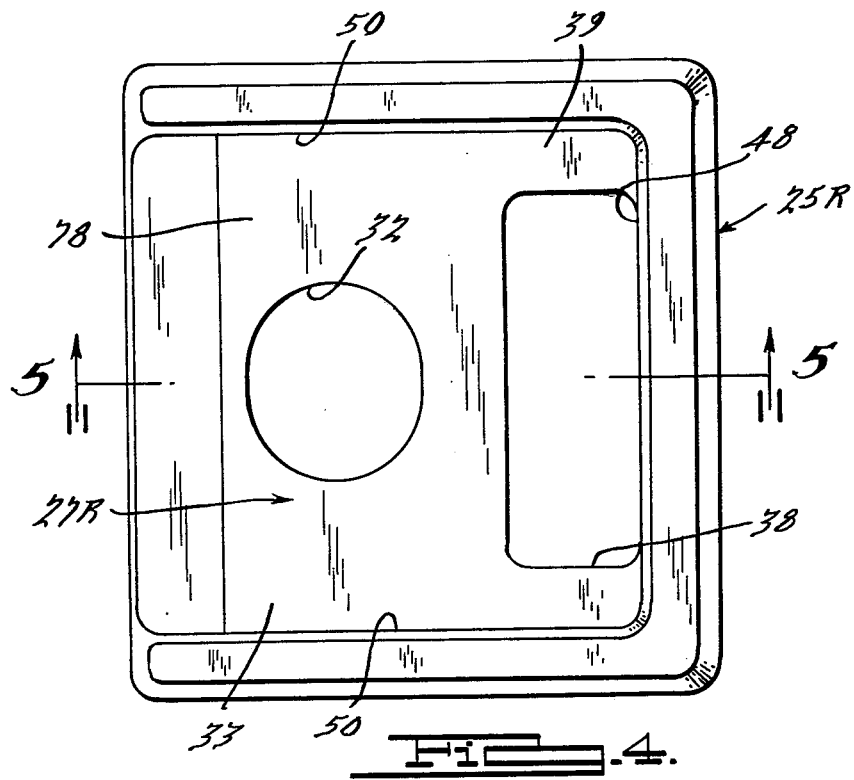
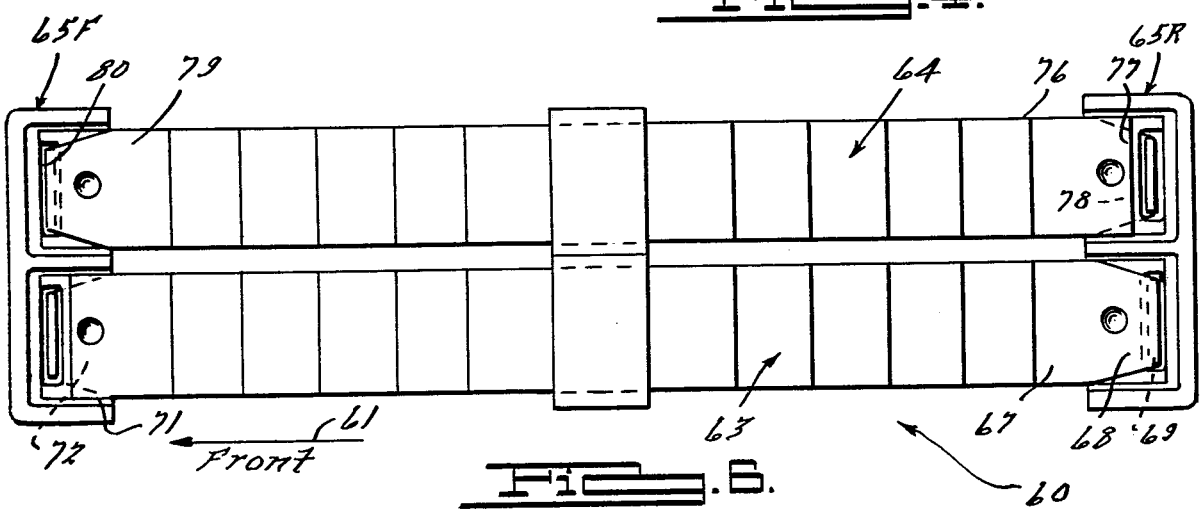

LEAF SPRING END MOUNTING STRUCTURE

BACKGROUND OF THE INVENTION

The invention relates generally to leaf spring suspension systems for heavy vehicles, such as railroad cars and the like. More particularly, the invention pertains to mounting or retaining structures for such leaf spring suspension systems.

Prior suspension systems, especially those employed on rail cars, typically employ full elliptic-type leaf springs arranged in either single-group or multiple-group configurations. The ends of the upper and lower segments of the single or multiple groups of leaf springs are connected by way of an end retaining structure. Such retaining structures frequently include a pin protruding through a laterally-extending aperture through double-wrapped eyelets integrally formed in the ends of the leaf springs. Alternatively, such prior art retaining structures may include a generally horizontally-extending end block with an aperture extending vertically therethrough. In such a configuration, dimples formed near the ends of the leaf springs protrude into the end block apertures.

An improved leaf spring end mounting structure, preferably for a full elliptic leaf spring suspension system, includes a flanged portion on one end of each of two coextensive primary leaf springs for protruding into elongated openings or slots located in end blocks at opposite ends of the suspension system. The protrusion of the flanges into the elongated openings limits the relative movement of the flanged ends of the primary leaf spring and the end block, thus tending to prevent the end blocks from becoming disengaged during service. The flanged ends of the two primary leaf springs are oriented at opposite ends of the suspension system and engage one side of load-transferring members on the end blocks. The opposite end of each primary leaf spring preferably has no flange thereon and engages the opposite side of the load-transferring member of its respective end block in an abutting relationship therewith.

Each end block preferably includes an end wall adjacent the elongated openings or slots and defining one of the elongated sides of the elongated openings. The end block also preferably includes side walls for receiving the leaf spring ends in engagement with said load-transferring member. The preferred load-transferring member further includes generally convex surfaces on its opposite faces whereby the area of engagement between the leaf spring ends and the load-transferring member increases as the leaf springs resiliently deflect and flatten in response to increased load on the springs.

The edges of the flanged ends of the leaf springs preferably converge toward the ends of the leaf springs, thereby providing clearance between the flanged end and the end block side walls so as to ensure substantially full penetration of the flange into the end block slot or opening and to allow for increased material thickness between the ends of the slots and the side walls.

The principles of the invention are equally applicable to single-group or multiple-group full elliptic leaf spring systems. In a multiple-group system having adjacent pairs of coextensive primary leaf springs, such adjacent groups are preferably identical but inverted with respect to each other. The ends of the adjacent groups engage a common end block at each opposite end of the suspension system. The multiple-group end blocks include multiple end slots and load-receiving members divided by generally parallel sidewalls for receiving the leaf spring ends therebetween.

BRIEF DESCRIPTION OF THE DRAWINGS

FIG. 1 is a side view of a single-group, full elliptic leaf spring suspension system embodying the present invention, with the end mounting apparatus shown in cross-section;

FIG. 2 is a top view of the suspension system shown in FIG. 1;

FIG. 3 is an enlarged top view of a flanged end of a leaf spring of the suspension system of FIG. 1;

FIG. 4 is a top view of an end block of the suspension system of FIGS. 1 through 3;

FIG. 5 is a cross-sectional view of the end block taken along lines 5—5 of FIG. 4 with the ends of the leaf springs shown in engagement therewith;

FIG. 6 is a top view of a double-group, full elliptic leaf spring suspension system embodying the invention;

DETAILED DESCRIPTION OF THE PREFERRED EMBODIMENTS

Figure 7:
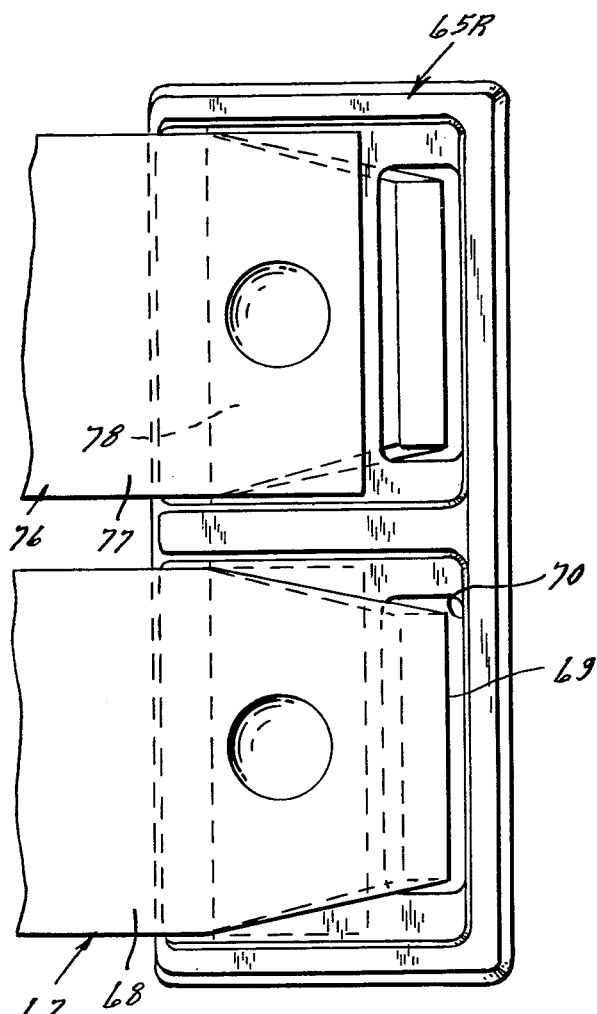
FIG. 7 is an enlarged top view of one end of the double-group suspension system of FIG. 6.

Referring to the drawings, wherein elements common to the various embodiments of the invention are indicated by common element numerals, FIGS. 1 and 2 illustrate side and top views, respectively, of suspension system 10 embodying the invention. Suspension system 10 is a single-group, full elliptic leaf spring suspension system having upper segment 11 and lower segment 12. For purposes of illustration and convenient reference only, direction arrow 14 indicates the orientation of suspension system 10 on a vehicle (not shown).

Upper and lower segments 11 and 12 each include a number of leaf spring elements bound together in a flush stacked relationship by clamp 17. Upper and lower primary springs 20 and 21 coextend the full longitudinal length of upper and lower segments 11 and 12. Generally coincident front ends 22F and 23F, and rear ends 22R and 23R, engage front and rear end blocks 25F and 25R, respectively.

Front end 22F of upper primary spring 20 includes dimple 28 protruding into a receptacle or aperture 29 in bearing portion 30 of load-transferring member 27F in front end block 25F. Likewise, rear end 22R of upper spring 20 includes dimple 31 protruding downwardly into a receptacle or aperture 32 in bearing portion 33 of rear end block 25R. However, rear end 22R also includes flange 36 protruding downwardly into, but preferably not in contact with the periphery of, end slot or opening 38 of horizontal plate 39 in rear end block 25R. Lower primary spring 21 is identical to upper primary spring 20, but installed in suspension system 10 in an inverted and reversed position. Thus dimple 41 on rear end 23R, and dimple 42 and upwardly-projecting flange 43 on front end 23F, engage receptacle or aperture 32 of rear end block 25R and receptacle or aperture 29 and end slot 44 of front end block 25F, respectively, in the same manner as is described above in connection with the corresponding elements of upper primary spring 20.

End blocks 25F and 25R include front and rear vertical end walls 47 and 48, respectively, for limiting the relative movement of the end blocks and the leaf springs, thereby tending to prevent the end blocks from becoming disengaged from between the leaf spring ends. End blocks 25F and 25R also include vertical side walls 49 and 50, respectively, which structurally reinforce the end blocks against vertical loads and retain the leaf spring ends therebetween.

FIG. 3 illustrates the preferred construction of the flanged ends 22R and 23F of primary srings 20 and 21. For purposes of illustration, only the flanged rear end 22R of upper primary spring 20 is shown in FIG. 3 since the preferred construction of the flanged spring ends throughout the various embodiments of the invention is similar to that of flanged rear end 22R. Rear end 22R includes converging lateral edges 51 which curve downwardly, culminating in flange 36. Such converging edges reduce the lateral width of flange 36, thereby providing for adequate lateral clearance between lateral edges 51 and vertical side walls 49 and 50 of end blocks 25F and 25R. Such lateral clearance is preferred in order to prevent binding between the lateral edges of the ends of the springs and the vertical side walls of the end blocks, thereby ensuring sufficiently deep penetration of the flanges into their respective end slots. Such reduced lateral-width also permits end slot 38 to be laterally narrower thus increasing the width of horizontal plate 39 on both lateral sides of end slot 38 in order to strengthen the end block.

FIGS. 4 and 5 illustrate the details of the construction and interrelationship of primary spring ends 22R and 23R with rear end block 25R. The construction and interrelationship of primary spring ends 22F and 23F with front end block 25F at the opposite end of suspension system 10 are identical to that shown in FIGS. 4 and 5 but inverted and reversed. Aperture 32 is centered both laterally and longitudinally in generally convex-shaped bearing portion 33. End slot or opening 38 is centered laterally between vertical side walls 50, with its rearward edge being defined by vertical end wall 48. Although aperture 32 is preferably formed as an aperture extending through bearing portion 33, a recess or receptacle may alternatively be employed.

As shown in FIG. 5, bearing portion 33 has generally convex upper and lower bearing surfaces 57 and 58 for engaging lateral spring surfaces 55 and 56 of spring ends 22R and 23R respectively. As primary springs 20 and 21 resiliently deflect and flatten under an increased vehicle load, spring ends 22R and 23R pivot toward end block 25R, thereby increasing the area of the load-bearing engagement between bearing surface 57 and lateral spring surface 55 and between bearing surface 58 and lateral spring surface 56. Thus when the load is greatest, the load-bearing engagement area between the leaf springs and the load-transferring members of the end blocks is maximized in order to minimize the stress concentrations on the components.

As may be best seen in FIG. 5, flange 36 of spring end 22R protrudes into but preferably does not contact the periphery of, end slot 38 in end block 25R, with its rearward-facing vertical surface spaced apart from rear vertical end wall 48 which defines the rearward elongated peripheral edge of end slot 38. Thus, any tendency of end block 25R to shift forwardly, as a result of the spring forces exerted on the rearwardly-converging convex bearing surfaces 57 and 58 of bearing portion 33, will result in an abutting interference between flange 36 and rear vertical end wall 48. Similarly, any tendency of end block 25R to become disengaged in a rearward direction will cause flange 36 to engage the front edge of end slot 38. Thus end block 25R is interlockingly trapped in its proper position between spring ends 22R and 23R under all load conditions.

As noted above, and as is shown in FIG. 1, the front end configuration of suspension system 10 is identical but inverted and reversed with respect to the rear end configuration shown in FIGS. 4 and 5. Thus upper primary spring 20 has flange 36 of its rear end 22R protruding into end slot 38 of rear end block 25R and its front end 22F in frictional load-transferring engagement with bearing portion 30 of front end block 25F. The configuration and orientation of lower primary spring 21 is inverted and reversed relative to that of upper primary spring 20, with its rear end 23R frictionally engaged bearing portion 33 of rear end block 25R in a load-transferring relationship therewith, and with its flange 43 of front end 23F protruding into end slot 44 of front end block 25F. The inverted and reversed, opposite-end relationship of the primary springs alleviates the possibility of front and rear vertical end walls 47 and 48 of end blocks 25F and 25R, respectively, being damaged or broken away from their respective vertical side walls by the force of the primary spring flanges when the leaf springs are deflected and flattened under a heavy load.

FIG. 6 is a top view of a double-group, full elliptic leaf spring suspension system 60, oriented on a vehicle (not shown) for purposes of illustration only as indicated by direction arrow 61. Outer spring assembly 63 and adjacent inner assembly 64 are identical but inverted relative to each other and are interconnected by front and rear end blocks 65F and 65R, respectively. Rear end block 65R, which is identical to front end block 65F but reversed, is shown in detail in FIG. 7.

Outer spring assembly 63 is similar to suspension system 10 of FIG. 1, both in its configuration and orientation and in its interrelationship with end blocks 65F and 65R. Its upper primary spring 67 has a rear spring end 68 engaging end block 65R with a downwardly-extending flange 69 protruding into, but preferably not in contact with the periphery of, end slot 70 in end block 65R. Front spring end 71 of upper primary spring 67 engages bearing portion 72 of front end block 65F. The lower primary spring (not shown) of outer spring assembly 63 is identical to upper spring 67 but is inverted and reversed, similar to the relative construction discussed above in connection with upper and lower primary springs of suspension system 10.

Inner spring assembly 64 is identical but inverted relative to adjacent outer spring assembly 63, and therefore includes an upper primary spring 76 having an orientation that is reversed relative to that of upper primary spring 67 of outer spring assembly 63. Upper primary spring 76 has a rear spring end 77 engaging bearing portion 78 of end block 65R and a front spring end 79 having a downward-extending flange protruding into end slot or opening 80 of front end block 65F. The lower primary spring (not shown) of inner spring assembly 64 is identical to upper primary spring 76 but is inverted and reversed similar to the relative construction discussed above in connection with the upper and lower primary springs of suspension system 10.

The identical but inverted relationship of adjacent inner and outer spring assemblies 64 and 63 alleviates the possibility of damaging the front and rear vertical end walls of front and rear end blocks 65F and 65R, respectively, in the same manner as is described above in connection with the corresponding elements of single-group suspension system 10. Furthermore, such inverted relationship of the inner and outer spring assemblies creates a positive interlocking retention of front and rear end blocks 65F and 65R, respectively. Such a positive interlocking retention results from the fact that each end block is engaged by flanges protruding upwardly through one end slot and downwardly through the adjacent end slot as is shown in FIG. 7. Thus each of the end blocks 65F and 65R are trapped by the ends of the leaf springs from both the upward and downward directions such that neither of the end blocks may escape or fall out of the suspension system in either the forward or rearward directions except upon the unlikely event of failure of the flanges on both of the primary springs engaging the same end block.

Figure 9:
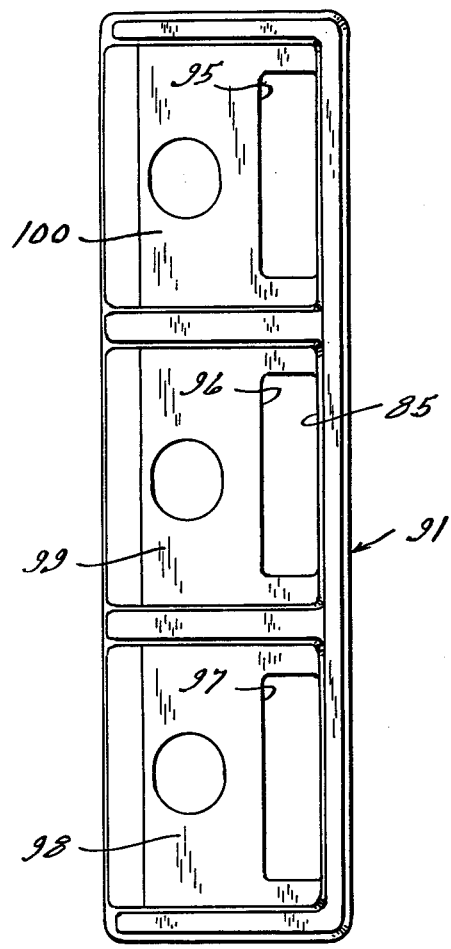
FIG. 9 is a top view of an end block of the triple-group suspension system of FIG. 8.
Figure 8:
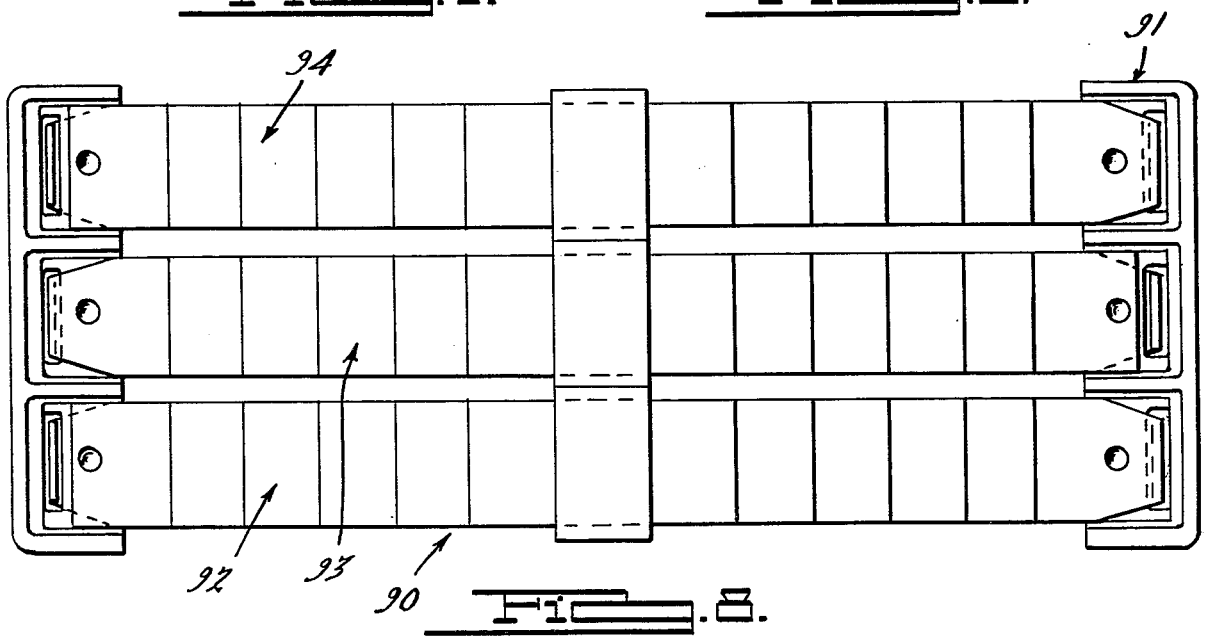
FIG. 8 is a top view of a triple-group, full elliptic leaf spring suspension system embodying the invention.

FIGS. 8 and 9 illustrate a triple-group, full elliptic suspension system 90 and the associated rear end block 91 thereof. Suspension system 90 includes outer spring assembly 92, intermediate spring assembly 93 and inner spring assembly 94. Each of the spring assemblies has the same identical but inverted relationship relative to its adjacent spring assembly as in double-group suspension system 60 discussed above. Also, the same identical, but inverted and reversed, end configuration exists in triple-group suspension system 90 as exists in the double-group suspension system 60 and the single-group suspension system 10 discussed above.

End block 91 shown in FIG. 9 includes end slots or openings 95, 96 and 97 adjacent common vertical end wall 85 as well as bearing portions 98, 99 and 100, for engagingly receiving the ends of the primary springs in the same manner as described above in connection with the single-group and double-group embodiments. Suspension system 90 and end block 91 of the triple-group design are shown in FIGS. 8 and 9 in order to illustrate the applicability of the principles of the invention to multiple-group suspension systems having any number of leaf spring assemblies.

The foregoing discussion relates to merely exemplary embodiments of the invention. Changes or modifications in the embodiments shown herein may be made without departing from the spirit or scope of the invention.

We claim:

1. A multiple-group, full elliptic leaf spring suspension system, comprising at least a pair of end block members, and at least two adjacent pairs of spaced-apart coextensive primary leaf springs, each opposite respective end of said pairs of leaf springs being adjacent and being in load-transferring engagement with one of a pair of end block members at opposite ends of said suspension system;

each of said end block members including a plurality of end slots extending therethrough corresponding to the adjacent pairs of primary leaf springs, an end wall forming a portion of the respective peripheries of each of said end slots, generally parallel side walls extending in a direction generally perpendicular to said end wall for receiving said respective leaf spring ends therebetween, and generally convex opposite load-transferring surfaces on said end block members, each of said respective leaf spring ends engaging one of said load-transferring surfaces at an angle relative thereto, said angle decreasing in response to increased resilient deflection of said leaf springs resulting from an increased load thereon, whereby the area of engagement between each leaf spring end and the corresponding load-transferring surface increases as said load on said leaf springs is increased;

each of said primary leaf springs having only one flanged end protruding through one of said end slots in one of said end block members with said end walls of said end block members being adapted for abuttingly engaging the respective flanged ends of said leaf springs, said flanged ends in each pair of said primary leaf springs being located at opposite ends of said suspension system, each pair of coextensive primary leaf springs being oriented with its respective flanged ends in an inverted relationship relative to the respective flanged ends of its adjacent coextensive pair of leaf springs, thereby limiting the relative movement of said end block members and the respective ends of said coextensive pairs of leaf springs.

* * * * *